(12) United States Patent
Kugimiya et al.

(10) Patent No.: US 9,902,346 B2
(45) Date of Patent: Feb. 27, 2018

(54) WIRE HARNESS (71) Applicant: YAZAKI CORPORATION, Tokyo (JP)

(72) Inventors: Yasuyuki Kugimiya, Makinohara (JP); Yukio Nishio, Makinohara (JP); Takahiro Saito, Makinohara (JP); Masashi Tsukamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/951,880

(22) Filed: Nov. 25, 2015

(65) Prior Publication Data
US 2016/0152197 A1 Jun. 2, 2016

(30) Foreign Application Priority Data
Nov. 27, 2014 (JP) .................. 2014-239416

(51) Int. Cl.
*H01B 7/00* (2006.01)
*H02G 3/04* (2006.01)
*B60R 16/02* (2006.01)

(52) U.S. Cl.
CPC ...... *B60R 16/0215* (2013.01); *B60R 16/0207* (2013.01); *H02G 3/0406* (2013.01); *H02G 3/0437* (2013.01)

(58) Field of Classification Search
CPC . C09J 7/02; C09J 7/0275; C09J 7/0289; C09J 2203/302; C09J 2423/006;
(Continued)

(56) References Cited

U.S. PATENT DOCUMENTS 3,128,214 A * 4/1964 Lay ............... H01B 7/0045
156/56
5,501,605 A * 3/1996 Ozaki ............. B60R 16/0207
174/72 A
(Continued)

FOREIGN PATENT DOCUMENTS

CN 101116225 A 1/2008
CN 103260957 A 8/2013
(Continued)

OTHER PUBLICATIONS

Office Action dated Oct. 25, 2016 issued by the Japanese Patent Office in counterpart Japanese Patent Application No. 2014-239416.
(Continued)

*Primary Examiner* — Timothy Thompson
*Assistant Examiner* — Guillermo Egoavil
(74) *Attorney, Agent, or Firm* — Sughrue Mion, PLLC (57) ABSTRACT A wire harness which is wired in an automobile for electrical connection includes one or a plurality of electrical pathways. The electrical pathway includes a plurality of division electrical pathways and one or a plurality of conductive linking members which link the division electrical pathways, and the linking member includes a body part and connecting ends that are located at the two ends of the body part. Further, the linking member is formed as a member whose rigidity is lower than that of the division electrical pathways and is adjustable and bendable in predetermined directions.

8 Claims, 10 Drawing Sheets (58) Field of Classification Search
CPC .......... H01F 27/323; H02G 1/06; H02G 3/04;
H02G 11/00; H02G 3/00; H02G 3/0406;
H02G 3/0437; H02G 3/0462; H02G
15/115; F16B 2/08; F16F 15/02; Y10S
174/26; Y10S 174/25; Y10T 428/2936;
Y10T 29/49117; B29C 44/5627; B29C
59/022; B60R 16/0215; B60R 16/02;
B60R 16/207; B60R 16/0222; B60R
16/027; B60R 16/0207; B65D 63/10;
H01B 7/00; H01B 7/0045; H01B 7/2825;
H01B 7/25; H01B 7/17; H01B 17/60;
H01B 17/66; H01B 1/023; H01B 7/0009;
H01B 13/02; H01B 13/0006; H01B
13/0036; H01L 317/60; H01L 317/66;
B60L 1/00; B60L 3/00; B62D 1/04;
H01R 35/04
USPC .................. 156/56; 174/68.3, 72 A, DIG. 25,
174/DIG. 26, 120 R, 350, 84 R, 88 R,
174/110 R, 128.1; 336/206; 428/377;
29/825; 307/10.1; 439/34, 45, 76.2, 404,
439/724
See application file for complete search history.

(56) References Cited

U.S. PATENT DOCUMENTS

| | | | |
|---|---|---|---|
| 5,561,266 A * | 10/1996 | Okamoto | .............. B60R 16/027 |
| | | | 174/72 R |
| 2004/0167752 A1* | 8/2004 | Sawai | ................. B60R 16/0207 |
| | | | 703/1 |
| 2005/0011687 A1 | 1/2005 | Yamaguchi et al. | |
| 2006/0278423 A1* | 12/2006 | Ichikawa | ............. B60R 16/0215 |
| | | | 174/72 A |
| 2007/0152504 A1* | 7/2007 | Hayes | ................. B60R 16/0207 |
| | | | 307/10.1 |
| 2008/0110659 A1 | 5/2008 | Ashibe | |
| 2011/0297416 A1* | 12/2011 | Hsieh | ................... H01R 35/025 |
| | | | 174/69 |
| 2013/0233586 A1* | 9/2013 | Park | ................... H01B 13/0036 |
| | | | 174/110 R |
| 2013/0248246 A1 | 9/2013 | Oga | |
| 2014/0251682 A1 | 9/2014 | Ichikawa et al. | |
| 2014/0345936 A1* | 11/2014 | Aizawa | ................ H01R 13/527 |
| | | | 174/72 A |

FOREIGN PATENT DOCUMENTS

| | | | | |
|---|---|---|---|---|
| CN | 103958278 A | 7/2014 | | |
| JP | 11-16425 A | 1/1999 | | |
| JP | 2000-82340 A | 3/2000 | | |
| JP | 2004-224156 A | 8/2004 | | |
| JP | 2013-109935 A | 6/2013 | | |
| WO | WO 2013014903 A1 * | 1/2013 | ............. | H01B 13/14 |
| WO | WO 2013081183 A1 * | 6/2013 | ............. | H01B 3/443 |

OTHER PUBLICATIONS

Office Action dated Jul. 24, 2017, by the State Intellectual Property Office of P.R. China in counterpart Chinese Application No. 201510849411.2.

* cited by examiner

WIRE HARNESS

CROSS REFERENCE TO RELATED APPLICATIONS

This application claims a benefit of Japanese Patent Application (No. 2014-239416) filed on Nov. 27, 2014, the contents of which are incorporated herein by reference.

BACKGROUND OF THE INVENTION

1. Technical Field

The present invention relates to a wire harness which is wired in an automobile for electrical connection, and particularly to a wire harness which includes one or a plurality of electrical pathways and an exterior member which accommodates most or a part of the electrical pathways.

2. Related Art

For example, a wire harness which electrically connects high voltage apparatuses that are loaded in a hybrid automobile or an electric automobile is disclosed in JP-A-2004-224156 as an example of high voltage wire harness. The wire harness includes three flexible high voltage electric wires (electrical pathways) and three exterior members that accommodate and protect the three high voltage electric wires respectively.

The exterior member is a metal pipe of a circular cross section, and when connectors or the like are attached to terminals of the high voltage electric wires after the high voltage electric wires are inserted through the exterior members, the production of the wire harness completes. In the production of the wire harness, the exterior members are bended to match the shape of an object where the wire harness is wired.

In the above traditional technique, because the wire harness is constituted by using the flexible high voltage electric wires (electrical pathways), to wire better in operativity the wire harness to match the shape of the object where the wire harness is wired (shape of the wiring course), it is necessary to wire after having maintained a shape with a metal pipe. That is, in the traditional technique, the metal pipe is a component necessary for operativity improvement.

The inventor of the present application has considered whether it is possible to maintain the shape to match the shape of the wiring object without using the metal pipe. As a result, it was considered to adopt new electrical pathways which have a shape-maintaining function, instead of the traditional high voltage electric wires. Specifically, it was considered to adopt rigid electrical pathways to have the shape-maintaining function.

However, if the electrical pathways which have rigidity as considered above are adopted, it was found that there were the following problems. First, because flexibility is lost similarly as when the metal pipe is used, therefore a packing operation must be performed while the wire harness is in a big state. Second, because the packing is performed in the big state, an enough transporting space must be ensured. Third, it is difficult to absorb the dimensional error at the time of wiring due to the rigidity, which has an influence on the operativity or the like. Fourth, it is difficult to cope if the resonance frequency of the wire harness is included in the frequency range of vehicle vibration, which, as a result, also has an influence on the operativity or the like similarly to the above.

The present invention is made in view of the above situations, and the object of the present invention is to provide a wire harness which makes it possible to improve the operativity or the like.

SUMMARY

According to an aspect of the invention, a wire harness which is wired in an automobile for electrical connection includes one or a plurality of electrical pathways. In the wire harness, the electrical pathway includes a plurality of division electrical pathways and one or a plurality of conductive linking members which link the division electrical pathways, the linking member includes a body part and connecting ends that are located at the two ends of the body part, and the linking member is formed as a member whose rigidity is lower than that of the division electrical pathways and is adjustable and bendable in predetermined directions.

According to the present invention having the above features, the wire harness includes one or a plurality of electrical pathways, and one electrical pathway is formed by linking a plurality of division electrical pathways with the linking members. Because the linking member has a rigidity lower than the division electrical pathway, and the linking member is adjustable and bendable in predetermined directions, if the arrangement of the linking member is adjusted, the linking member becomes a portion which contributes to improvement of operativity or the like. That is, if the wire harness includes one or a plurality of the electrical pathways, it is possible to improve operativity or the like.

(2) In the wire harness of (1), the linking member is formed to be shorter than the division electrical pathways.

According to the present invention having the above features, the effective linking member as the portion which contributes to the improvement of operativity or the like, may have a low rigidity, and may be adjustable and bendable in the predetermined directions. Therefore, the linking member functions sufficiently well even if used in a state of being shorter than the division electrical pathways which are a plurality of divided electrical pathways. According to the present invention, the ratio of the linking member to one electrical pathway is small, and therefore it is possible for the part of the division electrical pathway to play sufficiently well the function concerning the shape maintenance of the wiring course.

(3) In the wire harness of (1), the predetermined directions of the linking member are two directions, or 360 degrees directions.

According to the present invention having the above features, the electrical pathway is, for example, bendable upward and downward, bendable leftward and rightward or bendable in 360 degrees, at the position of the linking member. The bidirectional bending in the present invention, besides the above, may be, for example, folding backward at the front side and folding backward at the back side, or bending obliquely forward at the front side and bending obliquely forward at the back side, and various bendings (the application as the folding means in the configuration (5) is effective). According to the present invention, because at least bidirectional bendings are enabled, the operation of wiring the wire harness becomes easy (4) In the wire harness of (1), the linking member is arranged at least at one place in a range where the wire harness is wire along the body of the automobile.

According to the present invention having the above features, for example, when the wire harness is wired through the floor of the vehicle body, a part which is linked with the linking member is formed at at least one place in the range under the floor. Thereby, even if the wire harness is wired in a long range, the place becomes an application place as various means to be given in the invention of the following configuration (5), and as a result a better effect can be obtained.

(5) In the wire harness of (1), the linking member is applied as at least one of a folding means to make the wire harness compact while being packed before being wired to the automobile, a dimensional error absorbing means to absorb dimensional error at the time of wiring, and a resonance avoiding means to avoid resonance at the time of wiring.

According to the present invention having the above features, because the linking member is applied as a folding means, the electrical pathway becomes foldable at the position of the linking member, and as a result it is possible to make the wire harness compact in a packed state and a transportation state before being wired to an automobile. The linking member is applied as a dimensional error absorbing means, and can absorb the dimensional error at the time of wiring by being shrunk or bended. The linking member is applied as a resonance avoiding means and can avoid troubles due to resonance by excluding the resonance frequency of the wire harness from the frequency range of vehicle vibration. Other than the above means, it is definitely possible that the linking member is applied as bending means or vibration absorbing means.

(6) In the wire harness of (1), the division electrical pathway includes a rod-shaped conductor made of aluminum or aluminum alloy and an insulator which covers the rod-shaped conductor, and the shape of the division electrical pathway at the time of wiring is maintained by the rigidity of the rod-shaped conductor.

According to the present invention having the above features, the division electrical pathway includes a rod-shaped conductor made of aluminum or aluminum alloy and an insulator which covers the rod-shaped conductor. The shape of the wire harness at the time of wiring is maintained by the rigidity of the rod-shaped conductor in the division electrical pathway. Because the conductor of the division electrical pathway is made of aluminum or aluminum alloy, the wire harness can be lightweighted.

(7) In the wire harness of (1), the body part of the linking member includes a flexible twisted wire conductor made of aluminum or aluminum alloy, and an insulative coating which covers the twisted wire conductor.

According to the present invention having the above features, the linking member includes a flexible twisted wire conductor made of aluminum or aluminum alloy and an insulative coating which covers the twisted wire conductor. With the linking member of the above constitution, there is a part having flexibility in the wire harness, and as a result it is possible to improve operativity and the like. Because the conductor of the linking member is made of aluminum or aluminum alloy, the wire harness can be lightweighted.

(8) The wire harness of (1) further includes an exterior member made of resin to accommodate and protect the linking member.

According to the present invention having the above features, the linking member is accommodated and protected by the exterior member made of resin. Thereby, it is possible to protect and waterproof the connecting ends and regulate the course of the linking member. For example, a corrugated tube or protector are preferred for the exterior member made of resin.

According to the present invention described in (1), the wire harness includes one or a plurality of electrical pathways. One electrical pathway includes division electrical pathways which are a plurality of divided electrical pathways, and one or a plurality of conductive linking members which link the division electrical pathways that are next to each other. The linking member includes a body part and connecting ends located at the two ends of the body part. The linking member is formed as a member whose rigidity is lower than that of the division electrical pathways, and which is adjustable and bendable in predetermined directions. Therefore, the linking member can be used as a portion contributing to the improvement of operativity or the like, if the arrangement of the linking member is adjusted. That is, if the wire harness includes one or a plurality of the electrical pathways, an effect of being able to improve the operativity or the like is played.

According to the present invention described in (2), because the linking member is formed shorter than the division electrical pathway, a ratio of the linking member to one electrical pathway is small, and as a result, a function concerning the shape maintenance of the wiring course is not spoiled. Therefore, an effect of being able to provide a better wire harness is played.

According to the present invention described in (3), because the linking member is formed as a member which is bendable bidirectionally or in 360 degrees, an effect of being able to improving the operativity or the like is played due to the bending.

According to the present invention described in (4), because the linking member is arranged at at least one place in the range where the wire harness is wired along the vehicle body of the automobile, even if the wiring is performed in a long range, the wiring can be performed at the application places as the following means given in the invention of the following configuration (5). Therefore, an effect of being able to provide a better wire harness is played.

According to the present invention described in (5), because the linking member is applied as at least one of a folding means, a dimensional error absorbing means, and a resonance avoiding means, effects are played which are that the wire harness is compactified at the time of packing and transportation, it is easy to absorb the dimensional error at the time of wiring, troubles due to resonance after the wiring can be avoided.

According to the present invention described in (6), because the division electrical pathway includes the rod-shaped conductor made of aluminum or aluminum alloy and the insulator which covers the rod-shaped conductor, an effect of being able to maintain the shape at the time of wiring due to the rigidity of the rod-shaped conductor in the division electrical pathway is played.

According to the present invention described in (7), because the linking member includes the flexible twisted wire conductor made of aluminum or aluminum alloy and the insulative coating which covers the twisted wire conductor, an effect of being able to improve operativity and the like at the time of wiring and before and after the wiring due to the flexibility the twisted wire conductor in the linking member is played.

According to the present invention described in (8), the electrical pathway can be accommodated and protected by the exterior member, for example, made of resin such as a corrugated tube or protector. Therefore, an effect of being able to provide a better wire harness is played by adopting the exterior member made of resin.

BRIEF DESCRIPTION OF DRAWINGS

FIGS. 1A and 1B are figures which indicate wire harnesses of the present invention, in which

FIGS. 2A to 2C are figures which indicate an electrical pathway of the wire harness of FIGS. 1A and 1B, in which

FIGS. 3A and 3B includes figures which indicate an example of the electrical pathway connecting part of FIG. 2A, in which

FIGS. 5A and 5B are figures which indicate application examples of a linking member, in which

DETAILED DESCRIPTION OF EMBODIMENTS

A wire harness includes one or a plurality of electrical pathways. One electrical pathway includes division electrical pathways which are a plurality of divided electrical pathways, and one or a plurality of conductive linking members which link the division electrical pathways that are next to each other. The linking member includes a body part and connecting ends located at the two ends of the body part. The linking member is formed as a member whose rigidity is lower than that of the division electrical pathways, and which is adjustable and bendable in predetermined directions. Therefore, the linking member can be used as a portion contributing to the improvement of operativity or the like, if the arrangement of the linking member is adjusted.

[Embodiments]

Figure 1A:
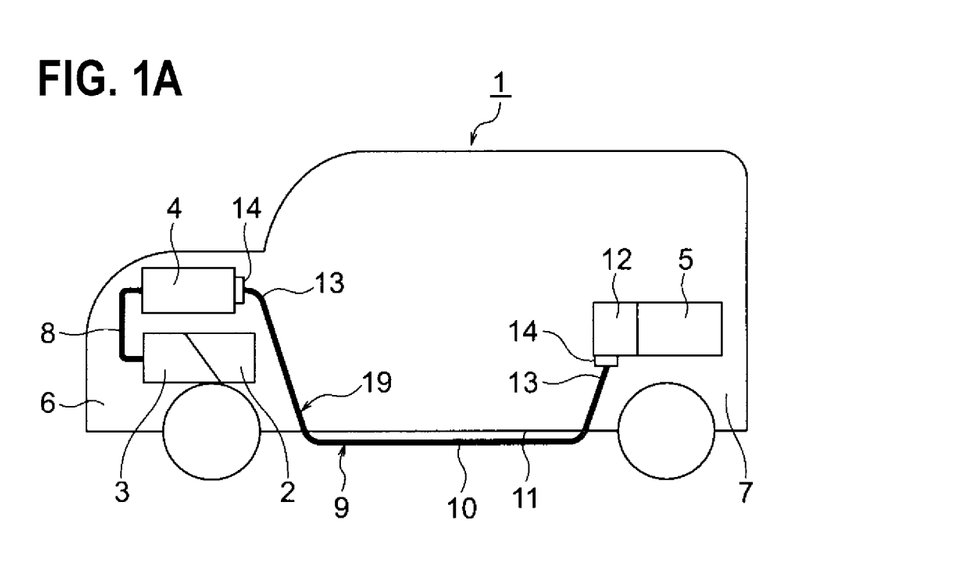
FIG. 1A is a schematic view which indicates that high voltage wire harnesses are wired.
Figure 1B:
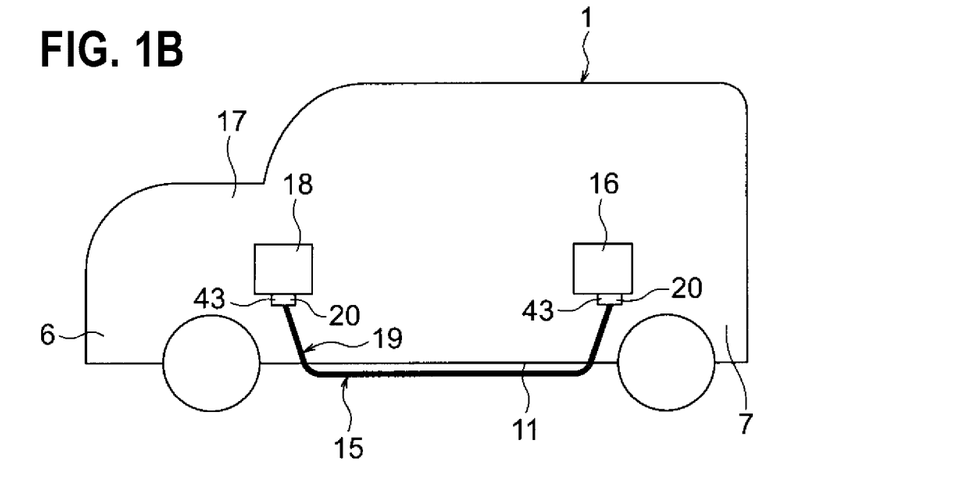
FIG. 1B is a schematic view which indicates that another low voltage wire harness is wired.
Figure 2A:
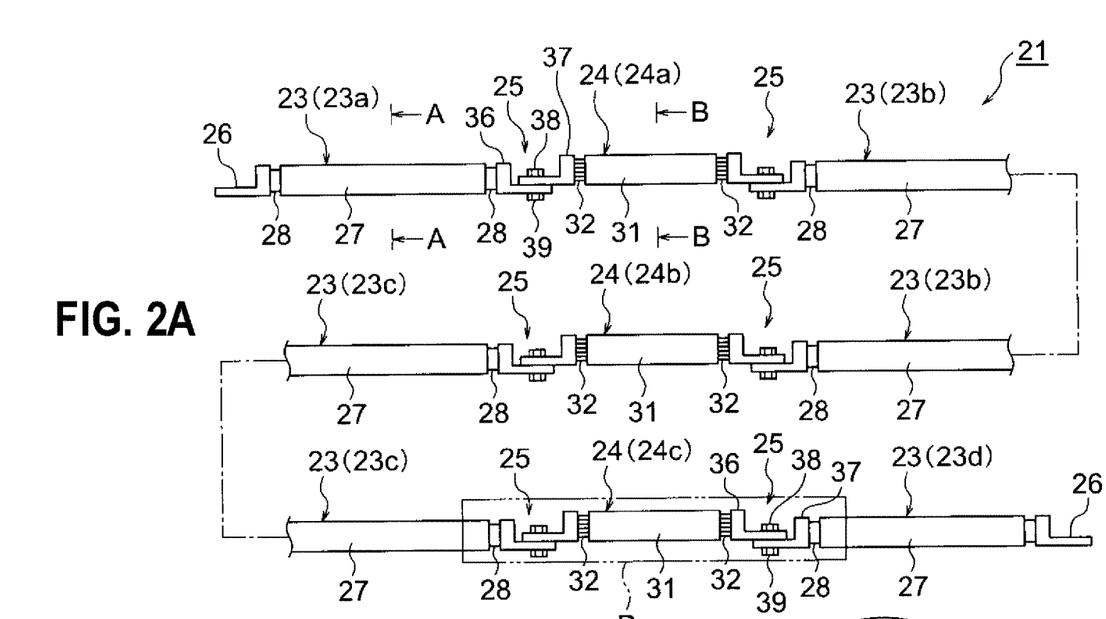
FIG. 2A is a schematic view which indicates the constitution of the electrical pathway.
Figure 2B:
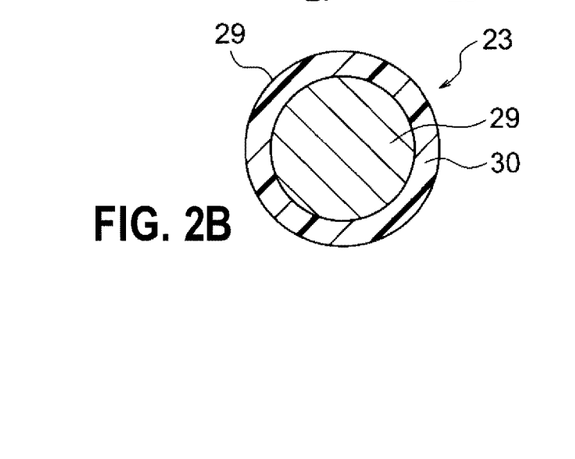
FIG. 2B is an A-A line sectional view.
Figure 2C:
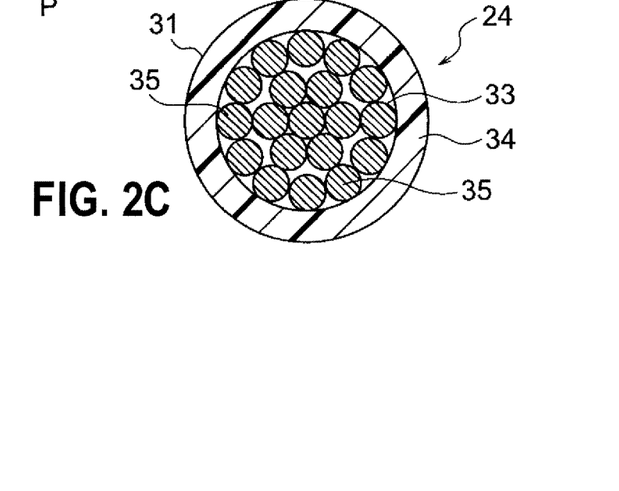
FIG. 2C is a B-B line sectional view.
Figure 3A:
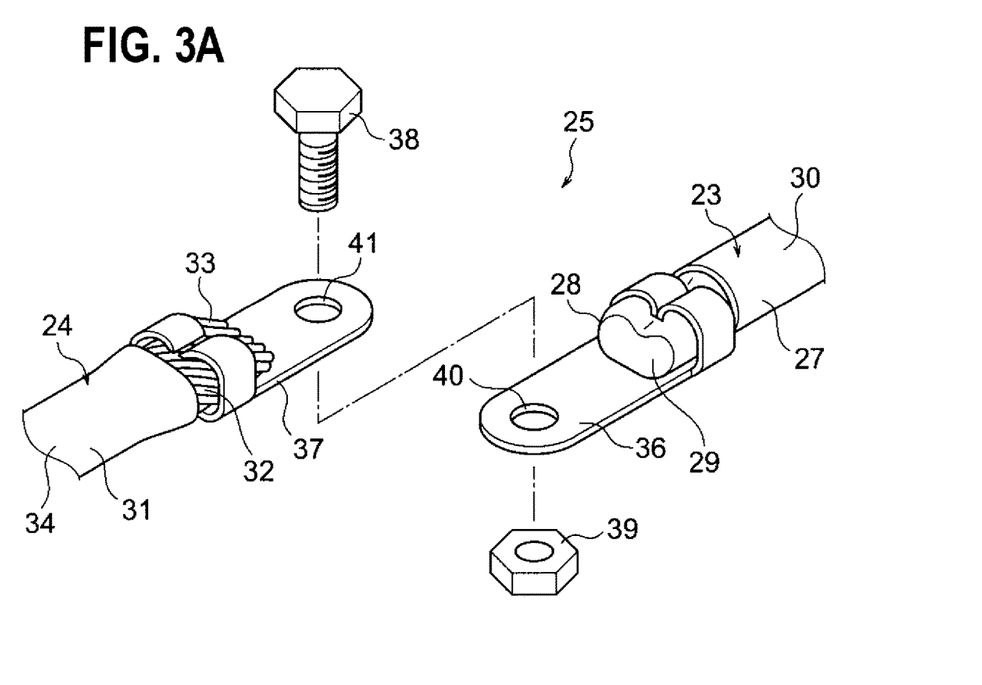
FIG. 3A is an exploded perspective view which indicates a joining type like that in FIG. 2A.
Figure 3B:
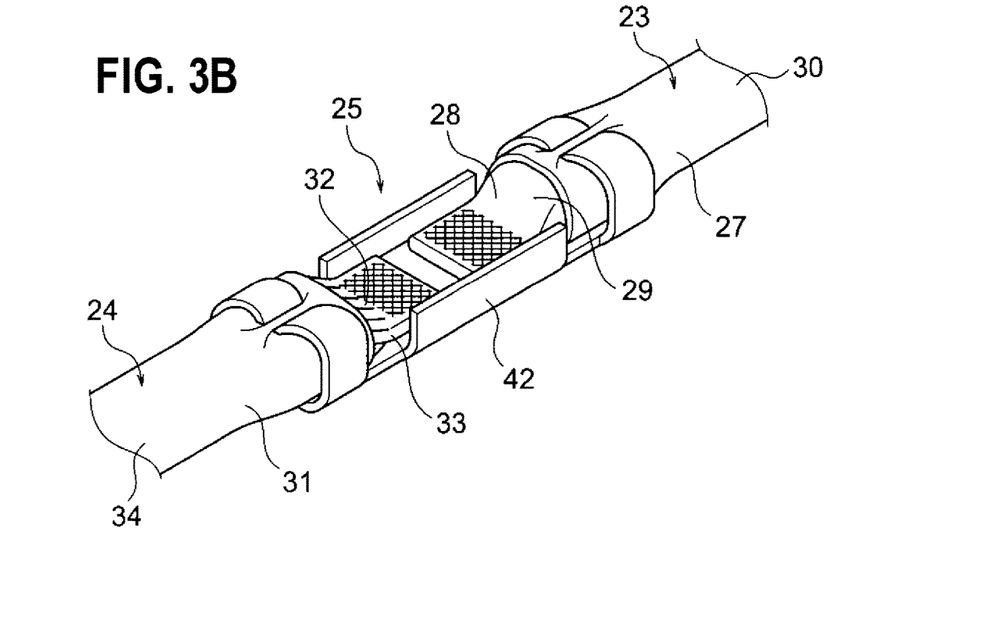
FIG. 3B is a perspective view which indicates a joining type which is another example.
Figure 4:
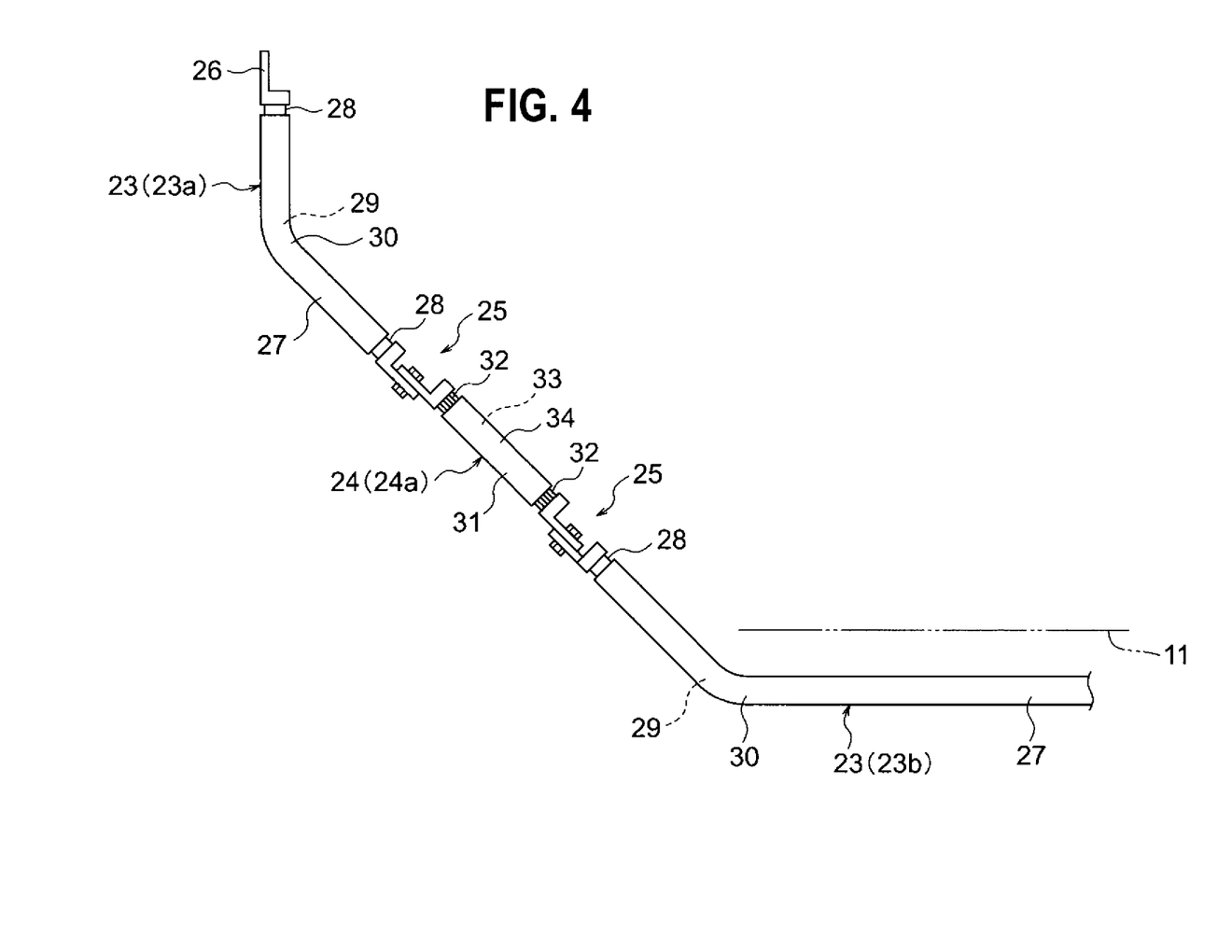
FIG. 4 is a schematic view which indicates that the electrical pathway is formed into a shape to match a wiring course.
Figure 5A:
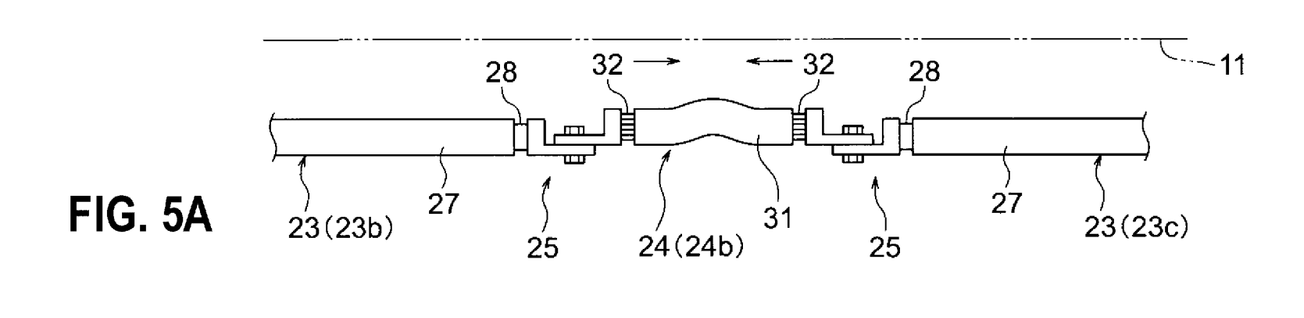
FIG. 5A is a schematic view which indicates that the linking member is applied as a dimensional error absorbing means.
Figure 5B:
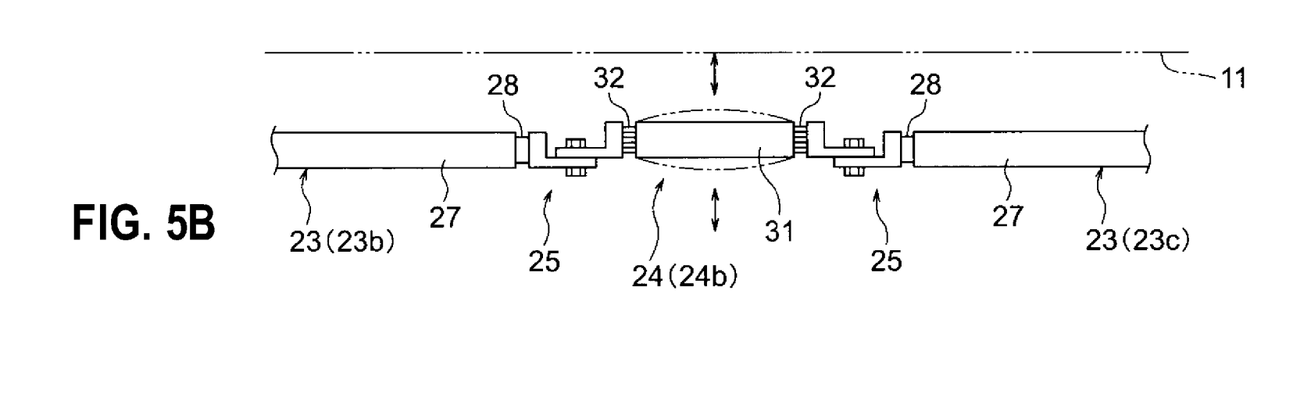
FIG. 5B is a schematic view which indicates that the linking member is applied as a resonance avoiding means.
Figure 6:
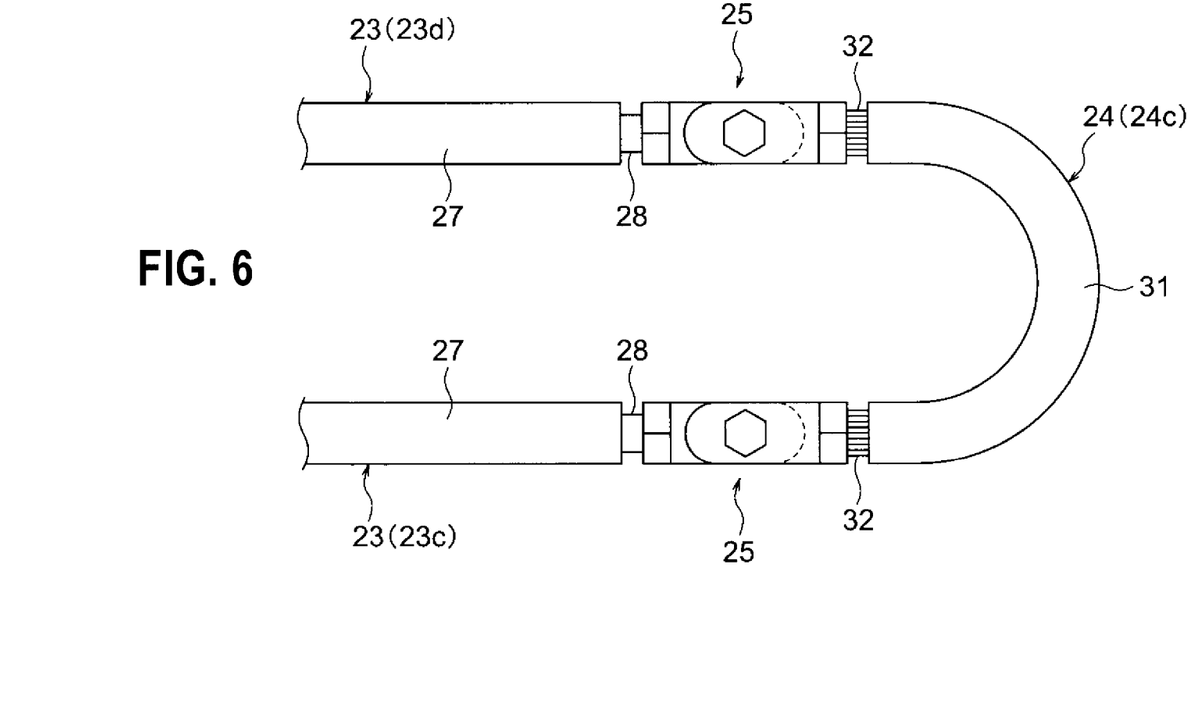
FIG. 6 is a figure which indicates an application example of the linking member, and is a schematic view which indicates that the linking member is applied as a folding means.
Figure 7:
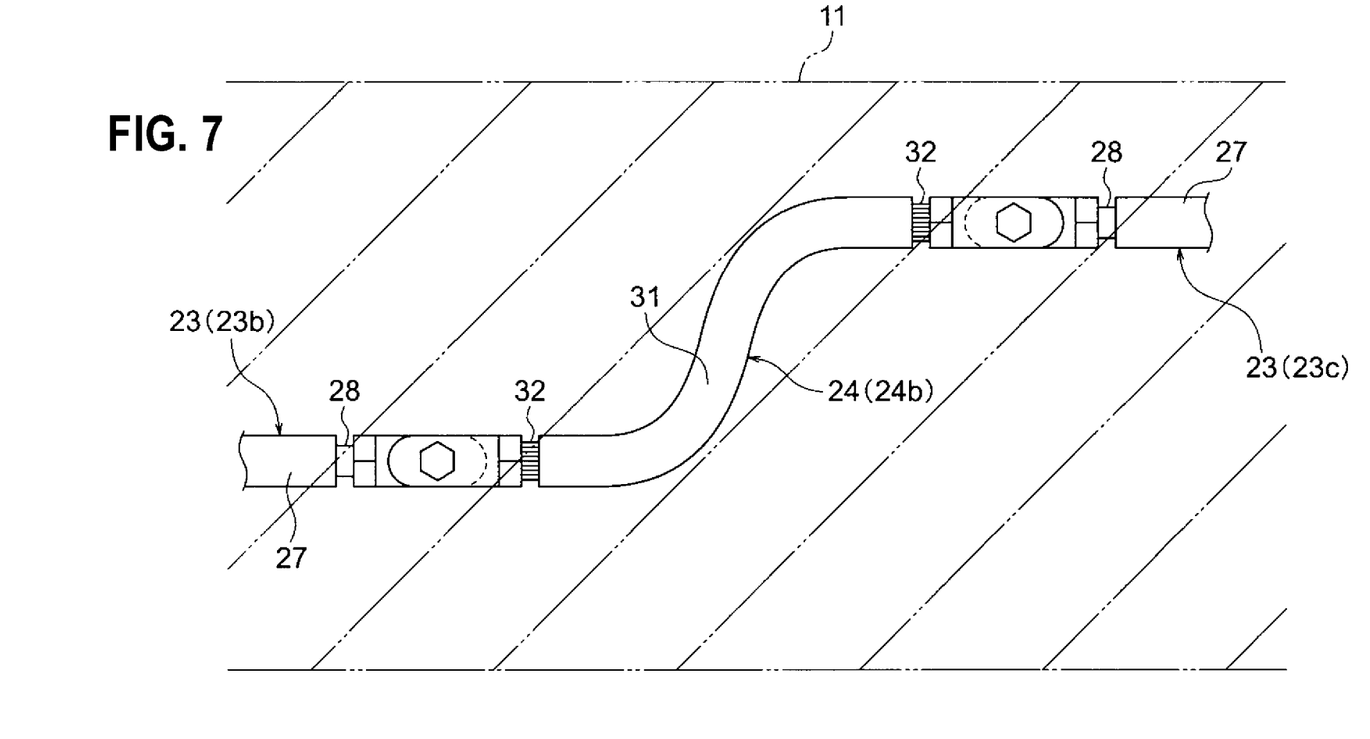
FIG. 7 is a schematic view which indicates another application example of the linking member.
Figure 8:
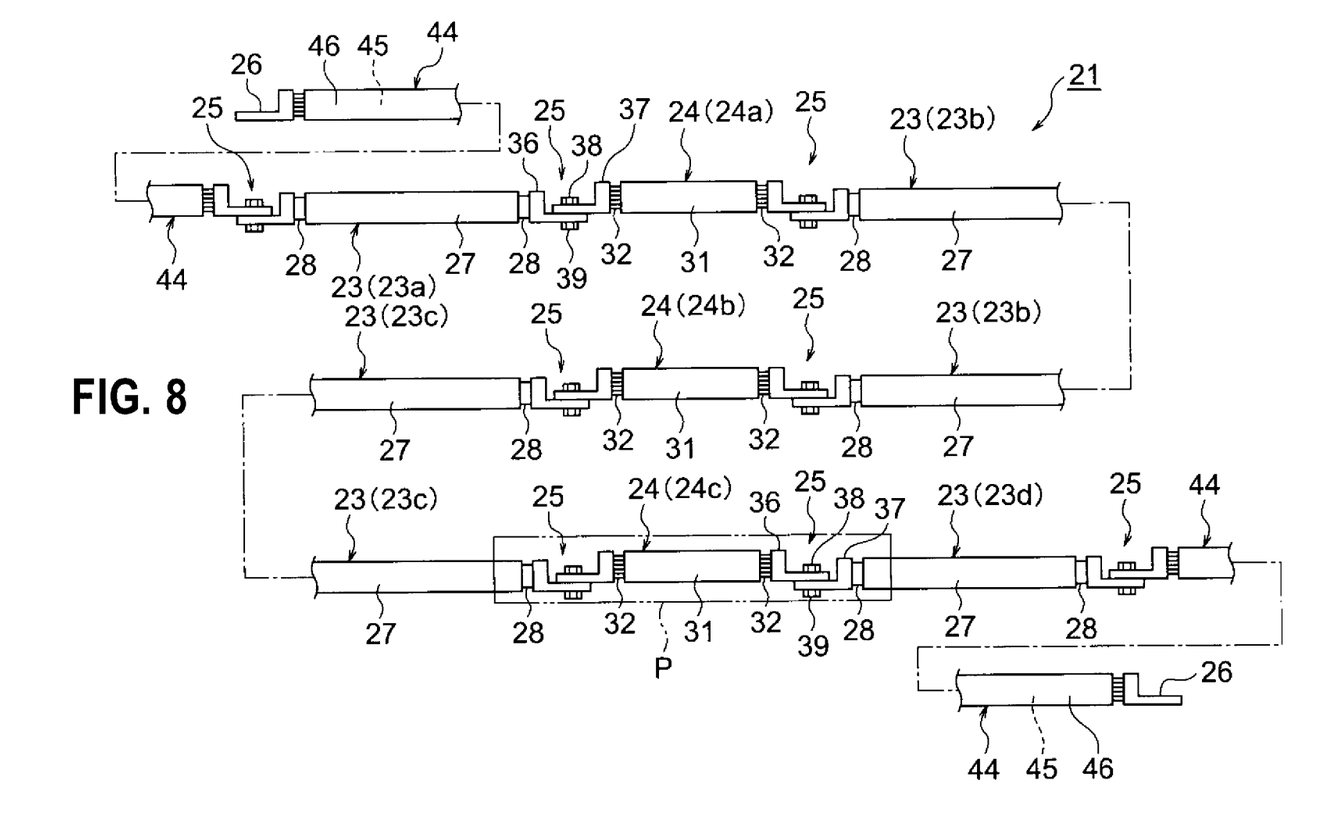
FIG. 8 is a schematic view which indicates the constitution of an electrical pathway which is another example.
Figure 9:
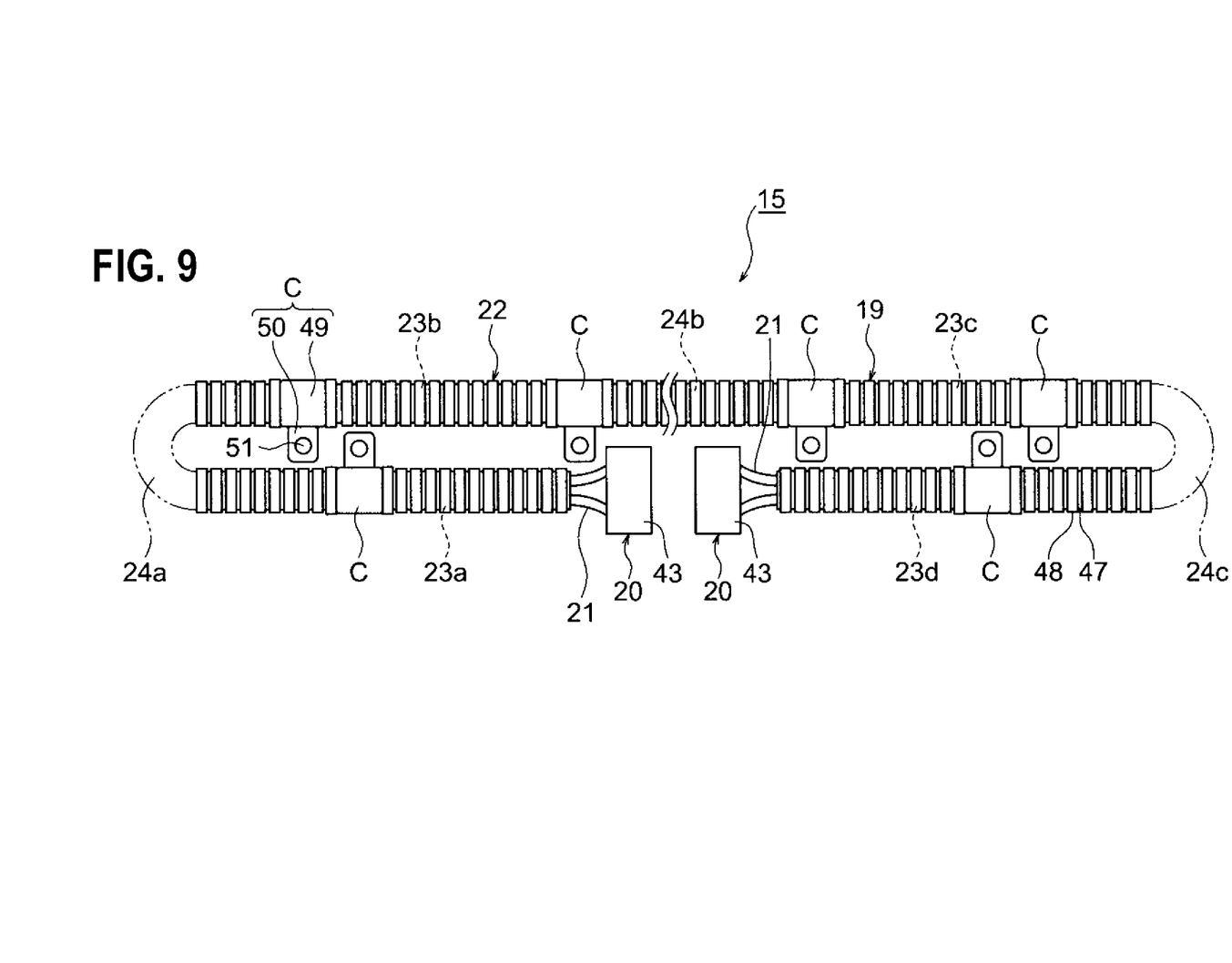
FIG. 9 is a schematic view which indicates an example while the electrical pathway is packed and transported.
Figure 10:
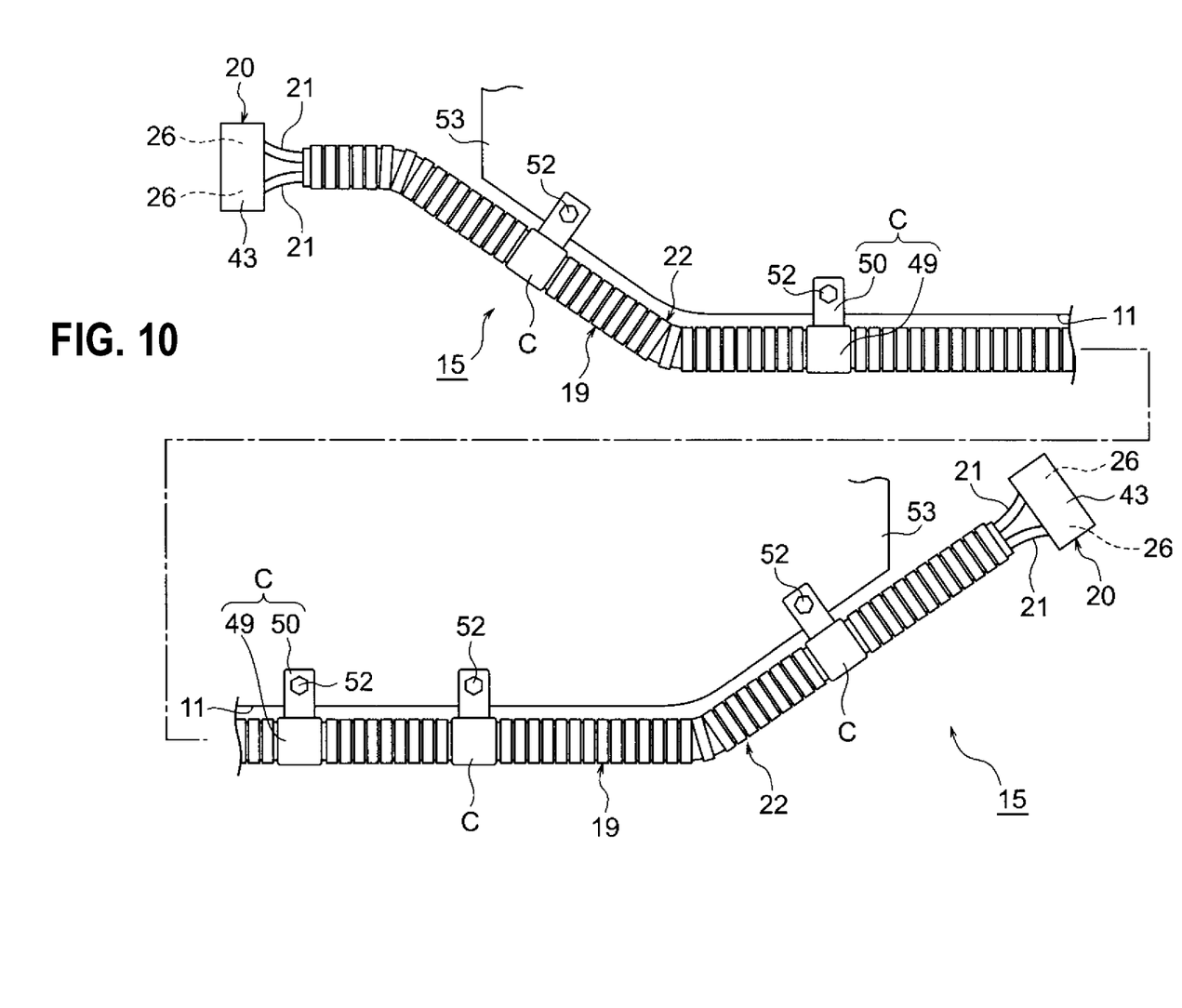
FIG. 10 is a schematic view which indicates an example while the electrical pathway is wired.

Below, an embodiment will be described with reference to the figures. FIGS. 1A and 1B are figures which indicate a wire harness of the present invention. FIGS. 2A to 2C are figures which indicate an electrical pathway of the wire harness of FIGS. 1A and 1B. FIGS. 3A and 3B are figures which indicate electrical pathway connecting part examples. FIG. 4 is a figure which indicates that the electrical pathway is formed into a shape to match a wiring course. FIGS. 5A and 5B are figures which indicate application examples of a linking member. FIGS. 6 and 7 are figures which indicate application examples of the linking member. FIG. 8 is a figure which indicates the constitution of an electrical pathway which is another example. FIG. 9 is a figure which indicates an example while the electrical pathway is packed and transported. FIG. 10 is a figure which indicates an example while the electrical pathway is wired.

In the present embodiment, the present invention is applied to a wire harness which is wired in a hybrid automobile (or an electric automobile or a general automobile which runs with an engine).

In FIG. 1A, a reference sign 1 indicates a hybrid automobile. The hybrid vehicle 1 is a vehicle which is driven by mixing two powers of an engine 2 and a motor unit 3, and the electric power from a battery 5 (battery pack) will be supplied to the motor unit 3 via an inverter unit 4. The engine 2, the motor unit 3 and the inverter unit 4 are loaded in an engine room 6 at the position of front wheels and the like in the present embodiment. The battery 5 is loaded in a vehicle rear part 7 of rear wheels and the like (it is also possible that the battery 5 is loaded in an automobile indoor room which is behind the engine room 6).

The motor unit 3 and the inverter unit 4 are connected by a high voltage (for high voltage) wire harness 8. The battery 5 and the inverter unit 4 are also connected by a high voltage wire harness 9. A middle part 10 of the wire harness 9 is wired below a vehicle floor 11 of the vehicle (vehicle body). The middle part 10 is wired substantially in parallel with the vehicle floor 11. The vehicle floor 11 is a well-known body (vehicle body) and is a so-called panel member, and through holes are formed at predetermined positions. The wire harness 9 is inserted through these through holes watertightly.

The wire harness 9 and the battery 5 are connected through a junction block 12 which the battery 5 is provided with. An external connecting means such as a shielding connector 14 which is disposed at a harness terminal 13 of the wire harness 9 at the rear end side is electrically connected to the junction block 12. Further, the wire harness 9 and the inverter unit 4 are electrically connected through an external connecting means such as a shielding connector 14 which is disposed at a harness terminal 13 of the wire harness 9 at the front end side.

The motor unit 3 includes a motor and a generator. The inverter unit 4 includes an inverter and a converter in structure. The motor unit 3 is formed as a motor assembly including a shielding case. The inverter unit 4 also is formed as an inverter assembly including a shielding case. The battery 5 is a Ni-MH battery or Li-ion battery, and is modularized. An electricity accumulating device such as a capacitor may be used. Of course, the battery 5 should not be particularly limited as long as the battery 5 may be used for the hybrid vehicle 1 or an electric automobile.

In FIG. 1B, a reference sign 15 shows a wire harness. The wire harness 15 is a low voltage (for low voltage) one, and is included to electrically connect a low voltage battery 16 at the vehicle rear part 7 of the hybrid vehicle 1 and a supplementary device 18 (apparatus) loaded at a vehicle front part 17. The wire harness 15, like the wire harness 9 in FIG. 1A, is wired through the vehicle floor 11 (as an example. It is also possible to be wired through the vehicle compartment sides).

As shown in FIGS. 1A and 1B, the high voltage wire harnesses 8 and 9 and the low voltage wire harness 15 are wired in the hybrid automobile 1. The present invention is applicable in any of the wire harnesses, but the low voltage wire harness 15 is described below as a representative example.

In FIG. 1B, the wire harness 15, which is a long one and is wired through the vehicle floor 11, includes a harness body 19, and connectors 20 (external connecting means) which are disposed at two ends of the harness body 19, respectively. The wire harness 15 further includes fixing members (for example, clamps C shown in FIGS. 9 and 10) for wiring at predetermined positions, and a waterproofing member (for example, a grommet) not shown.

The harness body 19 includes one or a plurality of electrical pathways 21 (refer to FIG. 2) and an exterior member 22 (refer to FIGS. 9 and 10) to accommodate and protect the one or a plurality of electrical pathways 21. The number of the electrical pathways 21 is two in the present embodiment, but this shall be an example. The constitution and structure of the exterior member 22 may allow the exterior member 22 to accommodate and protect the high voltage wire harness 9 together.

First, the constitution and structure of the electrical pathway 21 in the harness body 19 is described with reference to the figures.

In FIG. 2A, one electrical pathway 21 is constructed as follows. That is, the electrical pathway 21 includes, as illustrated in the present embodiment, division electrical pathways 23 (23a-23d), which are a plurality of divided electrical pathways, a plurality of linking members 24 (24a-24c) which link division electrical pathway 23 that are next to each other, electrical pathway connecting parts 25 which are formed as connecting portions that directly connect the division electrical pathways 23 and the linking members 24, and terminal metal fittings 26 which the terminals of the electrical pathway 21 are provided with. The electrical pathway 21, although it is hard to see from FIG. 2A, is a long one.

In the present embodiment, the electrical pathway 21 has four or more division electrical pathways 23 and linking members 24 whose number is the number of the division electrical pathways 23 subtracts 1. Therefore, it is found that the electrical pathway 21 of the present embodiment is not an electrical pathway of a simple constitution but an electrical pathway of many components. Further, it is found that the electrical pathway 21 is not a three-division electrical pathway, for example, having a first electrical pathway which becomes a main electrical pathway, and second electrical pathways which are connected to the two ends of the first electrical pathway. Furthermore, it is found that the electrical pathway 21, as can be seen in the following discussion, is not an electrical pathway in which the linking members 24 are arranged at at least one place in the range where the electrical pathway 21 is wired along the vehicle floor 11 (refer to FIG. 1), namely, an electrical pathway of a simple constitution in the above range.

The division electrical pathways 23 (23a-23d) are formed as a portion accounting for most of the electrical pathway 21. The division electrical pathway 23 includes a body part 27 and connecting ends 28 located at the two ends of the body part 27. The body part 27 includes a conductive rod-shaped conductor 29 and an insulative insulator 30 which coats the rod-shaped conductor 29. The connecting ends 28 are formed as connecting portions to connect with the linking member 24. In the present embodiment, the connecting ends 28 are formed by removing the insulator 30 at the terminals of the body part 27 to expose the rod-shaped conductor 29.

The division electrical pathway 23 (body part 27) is formed to have a length necessary to hold a shape along the wiring course. That is, each of the division electrical pathways 23a-23d is formed into an appropriate length. In the present embodiment, the division electrical pathways 23b, 23c are formed into lengths to be wired along the vehicle floor 11. The division electrical pathways 23b, 23c are formed to be relatively longer than the remaining division electrical pathways 23a, 23d.

In FIGS. 2A and 2B, the rod-shaped conductor 29 is manufactured of copper, copper alloy, aluminum or aluminum alloy. In the present embodiment, an aluminum conductor which has merits of being inexpensive and lightweight is adopted (an example). The rod-shaped conductor 29 is formed as a round rod wire of a circular cross section (or is formed as a square rod wire of a rectangular cross section). The rod-shaped conductor 29 is formed into a straight shape. The round rod wire (or the square rod wire) may be called a round single core wire (or a square single core wire). The rod-shaped conductor 29 is formed to have a rigidity to make it possible to hold the shape along the wiring course. The rigidity of the rod-shaped conductor 29 is the extent to which plastic deformation is resisted when some external force is applied, and therefore the rod-shaped conductor 29 is harder than a twisted wire conductor 33 to be described of the linking member 24.

The rod-shaped conductor 29 may be a bus bar or the like besides the above. That is, the rod-shaped conductor 29 shall not be particularly limited if the rod-shaped conductor 29 has the rigidity to make it possible to hold the shape. For example, the rod-shaped conductor 29 may be a hard twisted wire conductor.

The insulator 30 is formed as a coating of a circular cross section by extruding thermoplastic resin material around the outer peripheral surface of the rod-shaped conductor 29. Alternatively, the insulator 30 is formed as a coating to cover the outer peripheral surface of the rod-shaped conductor 29 by using a well-known heat shrinkable tube. The insulator 30 is formed with a predetermined thickness. Various types of well-known thermoplastic resin can be used as the above thermoplastic resin. For example, polymer materials such as polyvinyl chloride resin, polyethylene resin and polypropylene resin are appropriately selected.

In FIG. 2A, the linking member 24 (24a-24c) includes a body part 31 and connecting ends 32 located at the two ends of the body part 31. The linking member 24 is formed as a member whose rigidity is lower than that of the division electrical pathways 23, and which is adjustable and bendable in predetermined directions. The linking member 24 is one of the characteristic components in the electrical pathway 21.

The body part 31 includes a conductive, flexible twisted wire conductor 33 and an insulative coating 34 which coats the twisted wire conductor 33. The linking member 24 is formed to have a length necessary to play functions to be described below. Further, the linking member 24 is arranged at a position necessary to play the functions. The linking member 24 (body part 31) of the present embodiment is formed shorter than the division electrical pathway 23. The linking member 24 is formed to have such a length that a ratio of the linking members 24 to the electrical pathway 21 becomes small.

The connecting ends 32 are formed as connecting portions (linking portions) to connect with the division electrical pathways 23. In the present embodiment, the connecting ends 32 are formed by removing the coating 34 at the terminals of the body part 31 to expose the twisted wire conductor 33.

The linking member 24 is formed to be bendable bidirectionally, or in 360 degrees. Specifically, for example, the linking member 24 is formed to be bendable upward and downward, or bendable rightward and leftward, or bendable in 360 degrees. As can be seen from the following discussion, for example, the linking member 24 may be formed to be foldable backward at the front side and foldable backward at the back side, or bendable obliquely forward at the front side and bendable obliquely forward at the back side. The linking member 24 is formed to be bendable in various directions.

The linking member 24 (24a-24c) is applied as a means which plays the following functions. Specifically, the linking member 24 is applied as a bending means, a folding means, a dimensional error absorbing means, a resonance avoiding means, and a vibration absorbing means.

When the linking member 24 is applied as a bending means, the linking member 24 plays a function of making it possible to bend in the above two directions or in 360 degrees (it is also easy to unbend). When the linking member 24 is applied as a folding means, the linking member 24 plays a function of making compactification possible at the time of packing or transportation before the electric wire is wired to the hybrid automobile 1. When the linking member 24 is applied as a dimensional error absorbing means, the linking member 24 plays a function of absorbing the dimensional error at the time of wiring. When the linking member 24 is applied as a resonance avoiding means, the linking member 24 plays a function of making it possible to avoid resonance at the time of wiring. When the linking member 24 is applied as a vibration absorbing means, the linking member 24 plays a function of making it possible to absorb vibration at the time of wiring.

In FIGS. 2A and 2C, the twisted wire conductor 33 is manufactured of copper, copper alloy, aluminum or aluminum alloy. In the present embodiment, an aluminum conductor which has merits of being inexpensive and lightweight is adopted (an example). The twisted wire conductor 33 is formed by twisting a plurality of strands 35 into a shape of a circular cross section. The diameter and the number of the strands 35 are set so that the cross-sectional area of the twisted wire conductor 33 matches the cross-sectional area of the rod-shaped conductor 29 of the division electrical pathway 23. the twisted wire conductor 33 is formed to have such a flexibility that the rigidity of the twisted wire conductor 33 is lower than that of the rod-shaped conductor 29.

The coating 34 is formed as a coating (insulator) of a circular cross section by extruding thermoplastic resin material around the outer peripheral surface of the twisted wire conductor 33. The coating 34 is formed with a predetermined thickness. Various types of well-known thermoplastic resin can be used as the above thermoplastic resin. For example, polymer materials such as polyvinyl chloride resin, polyethylene resin and polypropylene resin are appropriately selected.

In FIG. 2A, as described above, the electrical pathway connecting part 25 is formed as a connecting portion which directly connects the division electrical pathway 23 and the linking member 24. The electrical pathway connecting part 25 is formed by tightening and fixing a connecting terminal 36 which the connecting end 28 of the division electrical pathway 23 is provided with and a connecting terminal 37 which the connecting end 32 of the linking member 24 is provided with by using a bolt 38 and a nut 39 (FIG. 2A indicates an joint type example). A more detailed structure is described as follows.

In FIG. 3A, the connecting end 28 of the division electrical pathway 23 is provided with the conductive connecting terminal 36. The connecting terminal 36 is crimped and connected with the connecting end 28 (rod-shaped conductor 29) of the division electrical pathway 23. The connecting terminal 36 is a well known one, and a bolt through hole 40 is formed at the electrical contact part of the connecting terminal 36. On the other hand, the connecting end 32 (the twisted wire conductor 33) of the linking member 24 is also provided with the connecting terminal 37. Like the connecting terminal 36, a bolt through hole 41 is formed at the electrical contact part of the connecting terminal 37.

When the connecting terminals 36, 37 of the division electrical pathway 23 and the linking member 24 are overlapped, the bolt 38 is inserted into the bolt through holes 40, 41, and the connecting terminals 36, 37 are fastened and fixed with the nut 39, thereby electrical connection completes. Then, when an insulative member (covered with tape winding or a heat shrinkable tube) not shown is provided outside the connection portion, the electrical pathway connecting part 25 is formed.

In FIG. 3B, the electrical pathway connecting part 25 of another joining type example is formed by using a joining terminal 42 as shown in the figure. The connecting end 28 (rod-shaped conductor 29) of the division electrical pathway 23 is joined to one end of the joining terminal 42. Further, the connecting end 32 (the twisted wire conductor 33) of the linking member 24 is joined to the other end of the joining terminal 42. The joining in the figure is a supersonic wave joining, but other well-known joining methods (including welding, cold welding, pop rivet, soldering) shall be allowed to be adopted. When the connecting end 28 (the rod-shaped conductor 29) of the division electrical pathway 23 and the connecting end 32 (the twisted wire conductor 33) of the linking member 24 are joined to the joining terminal 42, respectively, electrical connection completes. Then, when an insulative member (covered with tape winding or a heat shrinkable tube) not shown is provided outside the joining part, the electrical pathway connecting parts 25 is formed.

The electrical pathway connecting part 25 shall not be limited to the above examples as long as the connecting end 28 (the rod-shaped conductor 29) of the division electrical pathway 23 and the connecting end 32 (the twisted wire conductor 33) of the linking member 24 can be connected. In other ways, the electrical pathway connecting part 25 shall not be limited to the above examples as long as the linking member 24 can link the division electrical pathways 23, and as a result can electrically connect the division electrical pathways 23.

Back to FIG. 2, as described above, the terminals of the electrical pathway 21 are provided with terminal metal fittings 26. Specifically, the terminals of the division electrical pathways 23a and 23d are provided with the terminal metal fittings 26. The terminal metal fittings 26 are well-known terminal metal fittings, and are accommodated and held in connector housings 43 of the connectors 20 (refer to FIGS. 1, 9 and 10).

Next, based on the above constitution and structure, a shape of the wiring course formed by the electrical pathway 21 is described. In the description of the shape of the wiring course, the illustration of the exterior member 22 is omitted for convenience (the exterior member 22 will be described later).

In FIG. 4, the division electrical pathway 23a, the long division electrical pathway 23b, and the linking member 24a which links the division electrical pathway 23a and the long division electrical pathway 23b are illustrated here. The middle of the division electrical pathway 23a is maintained to a bended shape. The division electrical pathway 23a is maintained to a predetermined bended shape by plastically deforming the rod-shaped conductor 29 of the division electrical pathway 23a. One end side of the long division electrical pathway 23b is maintained to a bended shape. Similarly to the above, at the bended one end side, the division electrical pathway 23b is maintained to a predetermined bended shape by plastically deforming the rod-shaped conductor 29a. The middle of the long division electrical pathway 23b is wired along the vehicle floor 11. The linking member 24a is applied as a bending means to make it easy to, for example, handle the terminal side of the electrical pathway 21 at the time of wiring. The linking member 24a is applied as a vibration absorbing means to absorb vibration, for example, during a running after the wiring.

In FIGS. 5A and 5B, the long division electrical pathways 23b and 23c, and the linking member 24b which links the long division electrical pathways 23b and 23c are illustrated here. The long division electrical pathways 23b and 23c are wired along the vehicle floor 11, respectively. In FIG. 5A, the linking member 24b is applied as a dimensional error absorbing means to absorb the dimensional error which occurs, for example, at the time of wiring. Herein, the dimensional error is absorbed by shortening the linking member 24b. In FIG. 5B, the linking member 24b is applied as a vibration absorbing means to absorb, for example, vibration during a running after the wiring. Further, the linking member 24b is applied as a resonance avoiding means to avoid resonance after the wiring.

In FIG. 6, the division electrical pathway 23d, the long division electrical pathway 23c, and the linking member 24c which links the division electrical pathway 23d and the long division electrical pathway 23c are illustrated here. The division electrical pathway 23d and the long division electrical pathway 23c remain in a straight state. That is, a bending is not performed on the division electrical pathway 23d and the long division electrical pathway 23c. Because the linking member 24c is flexible, the linking member 24c is applied as a folding means to realize compactification at the time of packing or transportation before the wiring. Herein, the compactification is realized by bending the linking member 24c to be wrapped. The linking member 24c is returned to an original state (state before the packing) from the folded state before being wired to the hybrid automobile 1.

In FIG. 7, the long division electrical pathways 23b and 23c, and the linking member 24b which links the long division electrical pathways 23b and 23c are illustrated here. The long division electrical pathways 23b and 23c are wired planarly along the vehicle floor 11, respectively. The linking member 24b is applied as bending means to, for example, change the course of the electrical pathway 21 at the time of wiring. The linking member 24b in the figure is bended into a crank form, but this bended shape and bending direction shall be an example.

Then, with reference to FIG. 8, a variation of the electrical pathway 21 is described.

In FIG. 8, second division electrical pathways 44 are added to the terminals of the electrical pathway 21 which becomes the variation (in other words, the electrical pathway 21 has such a constitution and structure that the second division electrical pathways 44 are added to the terminals of the electrical pathway 21 of FIG. 2A. Because the second division electrical pathways 44 are added, the second division electrical pathways 44 are provided with the terminal metal fittings 26.) The second division electrical pathway 44 includes a flexible twisted wire conductor 45 which has conductivity, and an insulator 46 which coats the twisted wire conductor 45. The second division electrical pathway 44 is basically formed by changing the rod-shaped conductor 29 of the division electrical pathway 23 to the flexible twisted wire conductor 45. The second division electrical pathways 44 are added to make it easy to handle the terminal sides of the electrical pathway 21.

Next, with reference to FIGS. 9 and 10, the exterior member 22 is described.

In FIGS. 9 and 10, the exterior member 22 is a resin molded article that accommodates and protects the electrical pathway 21. In the present embodiment, a well-known corrugated tube is adopted as the exterior member 22. The exterior member 22, which is a corrugated tube, is formed to have a cross section of round shape in the direction perpendicular to the pipe axis (This is an example, and, for example, the cross section may be a flat form such as an oval shape or an ellipse shape). The exterior member 22 as a whole has flexibility. Because the exterior member 22 is a corrugated tube, the exterior member 22 is formed into a bellows pipe shape. Specifically, the exterior member 22 is formed to have circumferential bellows furrows 47 and bellows ridges 48, which alternate in the pipe axial direction.

Clamps C are assembled at predetermined positions of the exterior member 22. The clamp C has a pipe body mounting part 49 formed according to the shape (bellows pipe shape) of the exterior member 22 and a cantilever-like fixing part 50 next to the pipe body mounting part 49. The fixing part 50 is formed with a bolt through hole 51.

In the present embodiment, a corrugated tube is adopted as the exterior member 22, but the exterior member 22 shall not be limited to this. For example, it is possible to adopt a combination of the corrugated tube and a protector P (refer to FIGS. 2 and 8) made of resin, and it is also possible to adopt the protector P alone. While the part where it is desired to keep flexibility may be secured with the corrugated tube, in contrast, the part where it is desired to regulate the course may be coped with by assembling the protector P. Further, it is possible to cope with the above part by assembling the protector P to maintain the bended shape, for example, after having performed the bending. For example, the position to cover the linking member 24 and the portion around the linking member 24 may be an example of the assembling position of the protector P (it is also possible to assemble the protector P to the division electrical pathway 23). The protector P is not only limited to course regulation, but also effective as a reinforcing portion which address the problem of riding onto flying stones or a curbstone. Other than the corrugated tube and the protector P, a sheet member which is wound to cover the desired range or the like is also effective.

Next, the production, transportation and course wiring of the wire harness 15 are described.

In FIG. 9, first, the harness body 19 of the wire harness 15 is produced by inserting the electrical pathway 21 through the exterior member 22 which is resin molded into a substantially straight shape as a whole. Then, the connectors 20 are provided at the two terminals of the electrical pathway 21, and when the clamps C and other external parts are assembled to the predetermined positions of the exterior member 22 finally, the production completes.

After the production of the wire harness 15, when the wire harness 15 is bended to be folded at the predetermined positions as shown in FIG. 9 (for example, positions corresponding to the linking members 24a, 24c), the portions at the sides of the terminals and the middle portion of the wire harness 15 are arranged to be opposed substantially in parallel with each other. When the wire harness 15 is arranged in such a way, the full length of the wire harness 15 is shortened and the wire harness 15 is packed with the minimum width. That is, the whole of the wire harness 15 is packed in a compact state. Then, the wire harness 15 is transported in this compact state.

When the wire harness 15 is unpacked after the transportation, the wire harness 15 becomes in the same state as after the production. Then, the wire harness 15 is attached and fixed to a fixing object 53 such as the vehicle floor 11 through bolts 52 which are inserted through the bolt through holes 51 (the shape of the fixing object 53 is one example). When the wire harness 15 is attached and fixed to the fixing object 53, the predetermined course wiring completes as shown in FIG. 10. Of course, the constitution and structure of the electrical pathway 21 function effectively in the course wiring.

As described above with reference to FIGS. 1A to 10, the wire harness 15 includes a plurality of the electrical pathways 21. The electrical pathway 21 includes the plurality of division electrical pathways 23 into which the electrical pathway 21 is divided and the conductive linking members 24 which link the division electrical pathways 23 which are next to each other. The linking member 24 includes the body part 31 and connecting ends 32 located at the two ends of the body part 31. The linking member 24 is formed as a member whose rigidity is lower than that of the division electrical pathways 23, and which is adjustable and bendable in predetermined directions. Therefore, this linking member 24 can be used as a portion contributing to improvement of operativity or the like if the arrangement of the linking member 24 is adjusted. That is, if the wire harness 15 includes a plurality of the electrical pathways 21, an effect of being able to improve the operativity or the like is played.

According to the wire harness 15, because the linking member 24 is formed shorter than the division electrical pathway 23, a ratio of the linking member 24 to one electrical pathway 21 is small, and as a result, a function concerning the shape maintenance of the wiring course is not spoiled. Therefore, an effect of being able to provide a better wire harness 15 is played.

According to the wire harness 15, because the linking member 24 is formed as a member which is bendable bidirectionally or in 360 degrees, an effect of being able to improving the operativity or the like is played due to the bending.

According to the wire harness 15, because the linking member 24 is arranged at at least one place in the range where the wire harness 15 is wired along the vehicle floor 11, even if the wiring is performed in a long range, the wiring can be performed at the application places as the following means. Therefore, an effect of being able to provide a better wire harness 15 is played.

According to the wire harness 15, because the linking member 24 is applied as a bending means, a folding means, a dimensional error absorbing means, a resonance avoiding means, a vibration absorbing means and the like, effects are played which are that the wire harness 15 is compactified at the time of packing or transportation, it is easy to bend and absorb the dimensional error at the time of wiring, troubles such as resonance after the wiring can be avoided, and vibration can be absorbed.

It is apparent that various modifications can be made to the present invention without changing the purpose of the present invention.

What is claimed is:

1. A wire harness which is wired in an automobile for electrical connection, comprising one or a plurality of electrical pathways,
   wherein the electrical pathway includes a plurality of division electrical pathways and one or a plurality of conductive linking members which link the division electrical pathways,
   the linking member includes a body part and connecting ends that are located at the two ends of the body part,
   the linking member is formed as a member whose rigidity is lower than that of the division electrical pathways and is adjustable and bendable in predetermined directions, and
   wherein the linking member is applied as a resonance avoiding means to avoid resonance at the time of wiring.

2. The wire harness according to claim 1, wherein the linking member is formed to be shorter than the division electrical pathways.

3. The wire harness according to claim 1, wherein the predetermined directions of the linking member are two directions, or 360 degrees directions.

4. The wire harness according to claim 1, wherein the linking member is arranged at least at one place in a range where the wire harness is wire along the body of the automobile.

5. A wire harness which is wired in an automobile for electrical connection, comprising one or a plurality of electrical pathways,
   wherein the electrical pathway includes a plurality of division electrical pathways and one or a plurality of conductive linking members which link the division electrical pathways,
   the linking member includes a body part and connecting ends that are located at the two ends of the body part,
   the linking member is formed as a member whose rigidity is lower than that of the division electrical pathways and is adjustable and bendable in predetermined directions, and
   wherein the linking member is applied as at least one of a folding means to make the wire harness compact while being packed before being wired to the automobile, a dimensional error absorbing means to absorb dimensional error at the time of wiring, and a resonance avoiding means to avoid resonance at the time of wiring.

6. The wire harness according to claim 1, wherein the division electrical pathway includes a rod-shaped conductor made of aluminum or aluminum alloy and an insulator which covers the rod-shaped conductor, and the shape of the division electrical pathway at the time of wiring is maintained by the rigidity of the rod-shaped conductor.

7. The wire harness according to claim 1, wherein the body part of the linking member includes a flexible twisted wire conductor made of aluminum or aluminum alloy, and an insulative coating which covers the twisted wire conductor.

8. The wire harness according to claim 1 further comprising an exterior member made of resin to accommodate and protect the linking member.

* * * * *